Aug. 6, 1963    W. R. SIZEMORE    3,100,010
DEVICE FOR STRAIGHTENING AND ALIGNING THE
POINTS OF KNITWEAR LOOPING MACHINES
Filed Feb. 17, 1959    8 Sheets-Sheet 1

INVENTOR.
Walter Ray Sizemore,
BY Paul & Paul
ATTORNEYS.

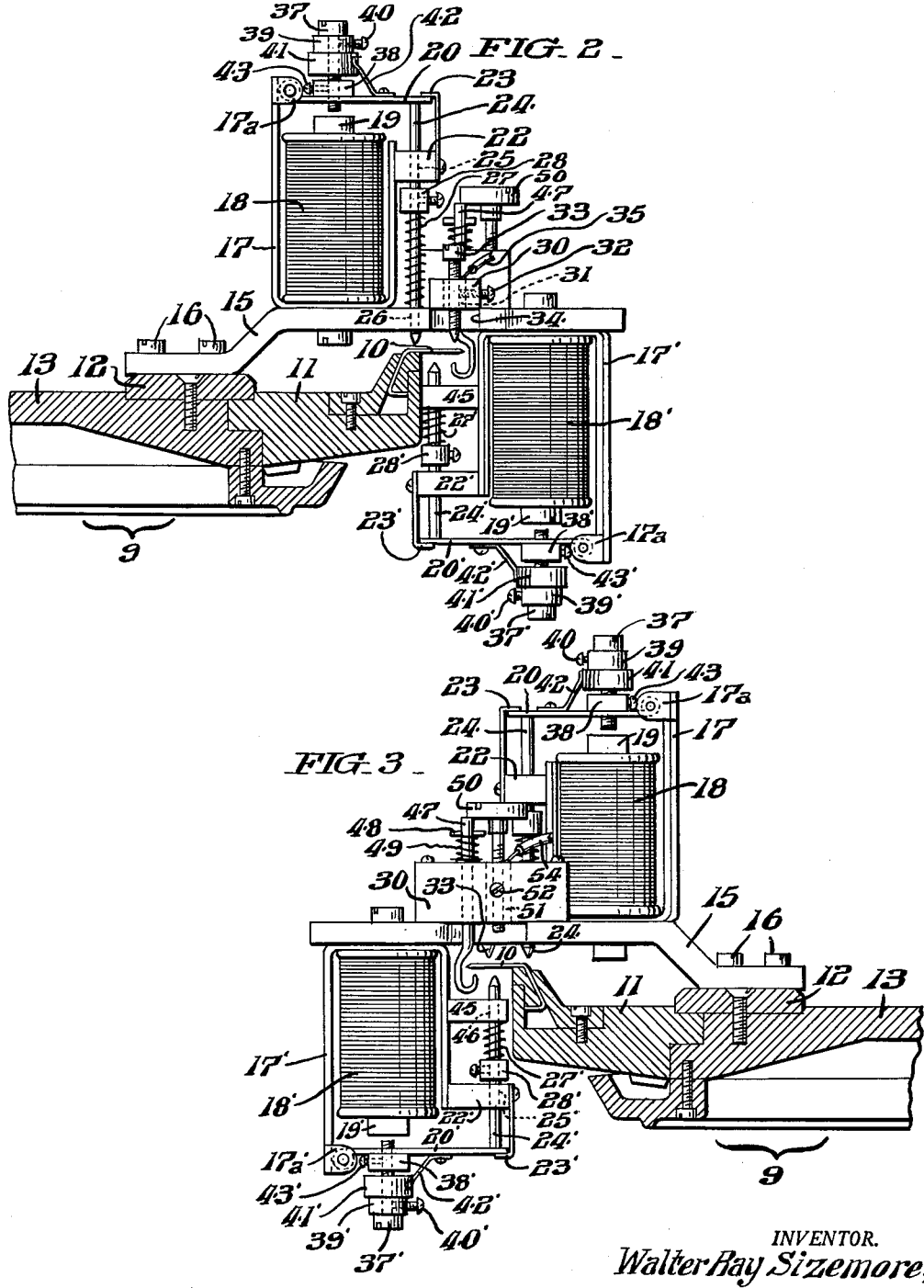

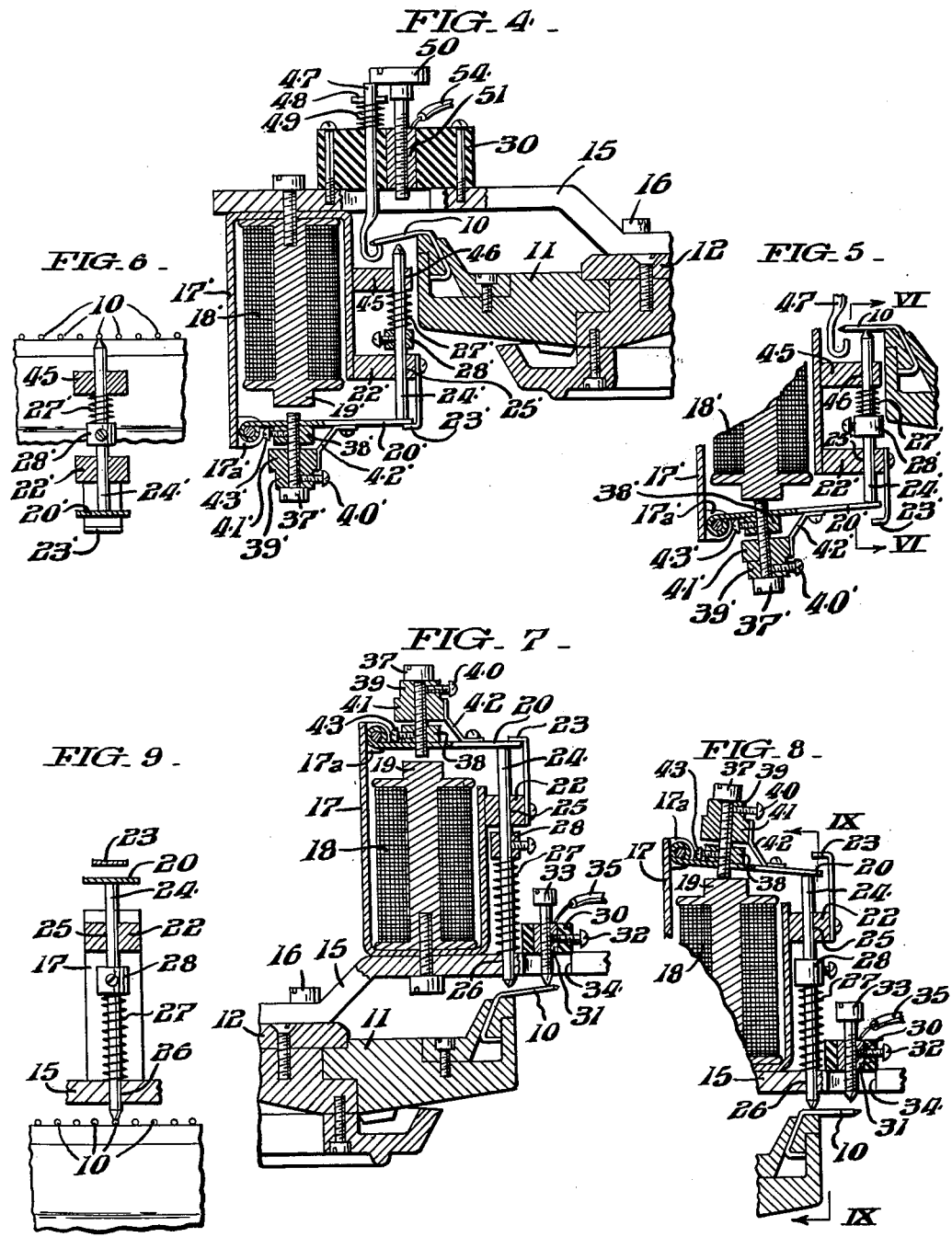

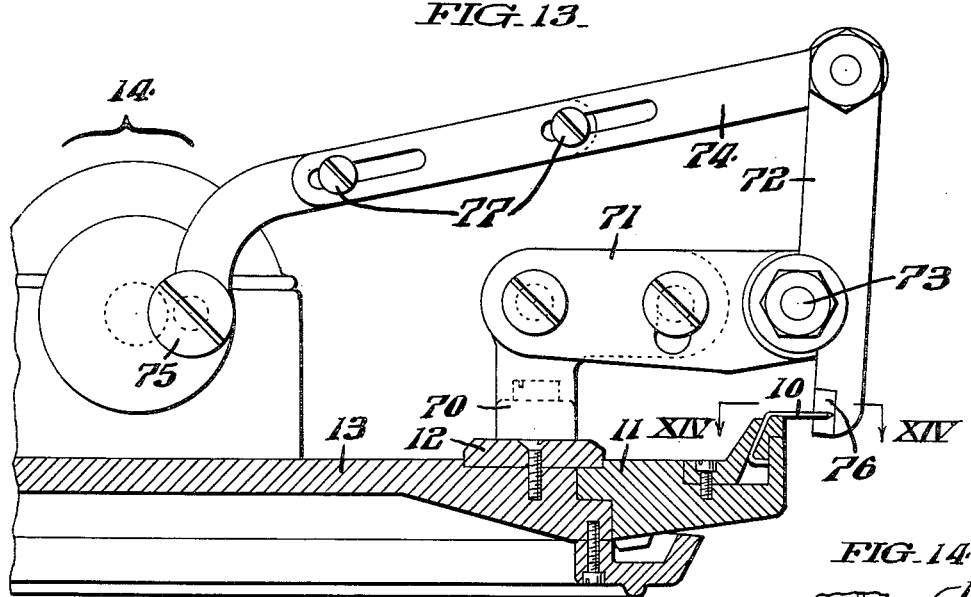
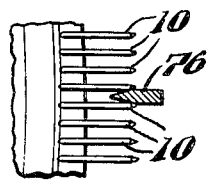
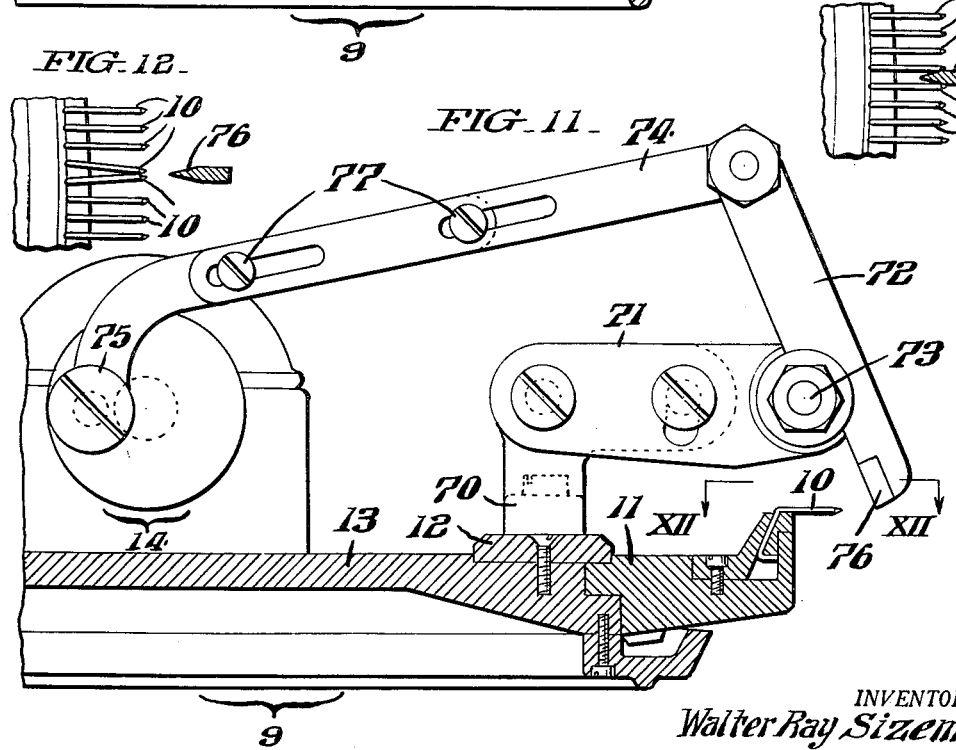

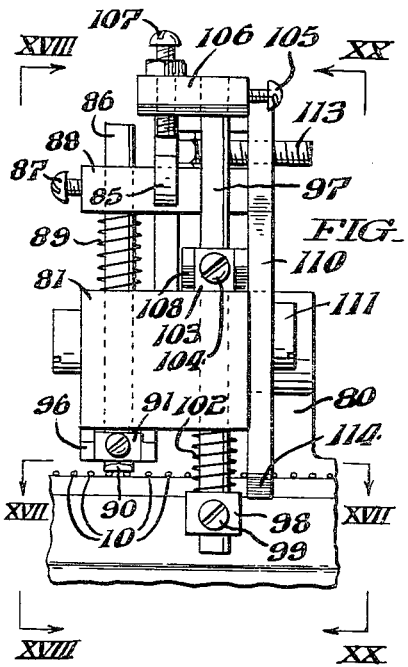
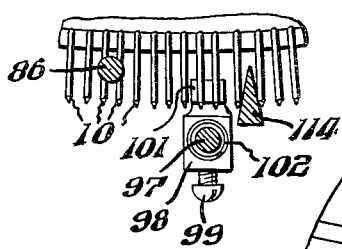
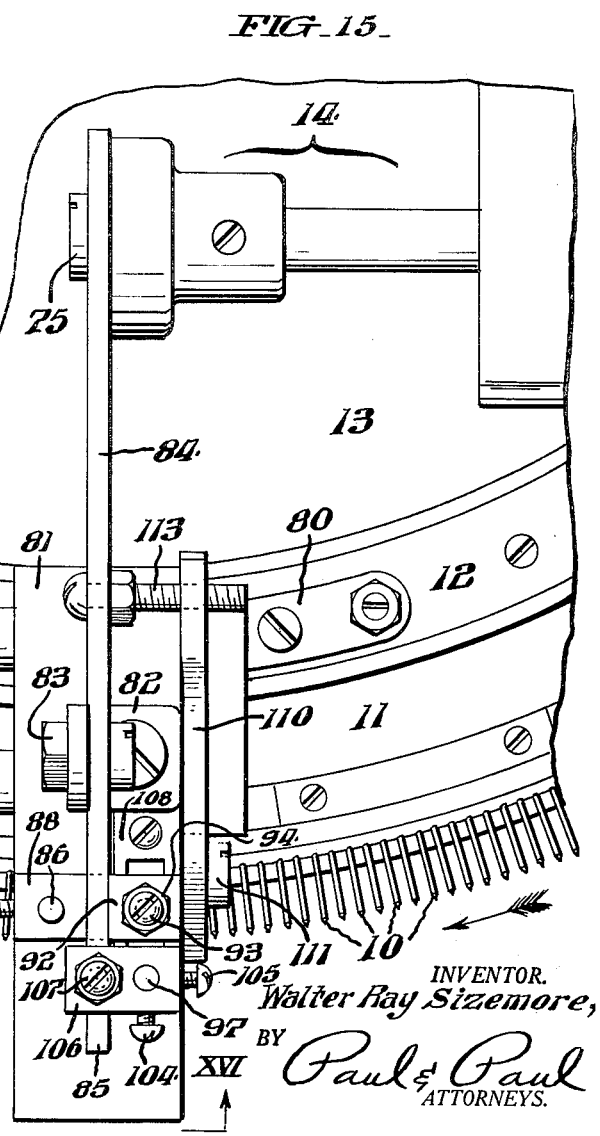

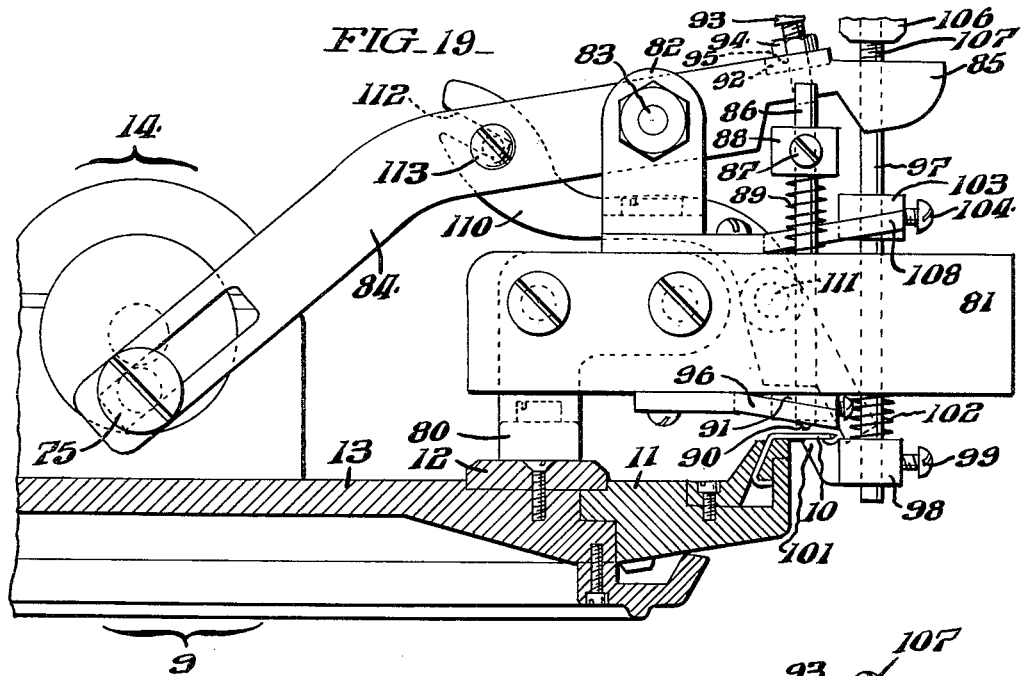
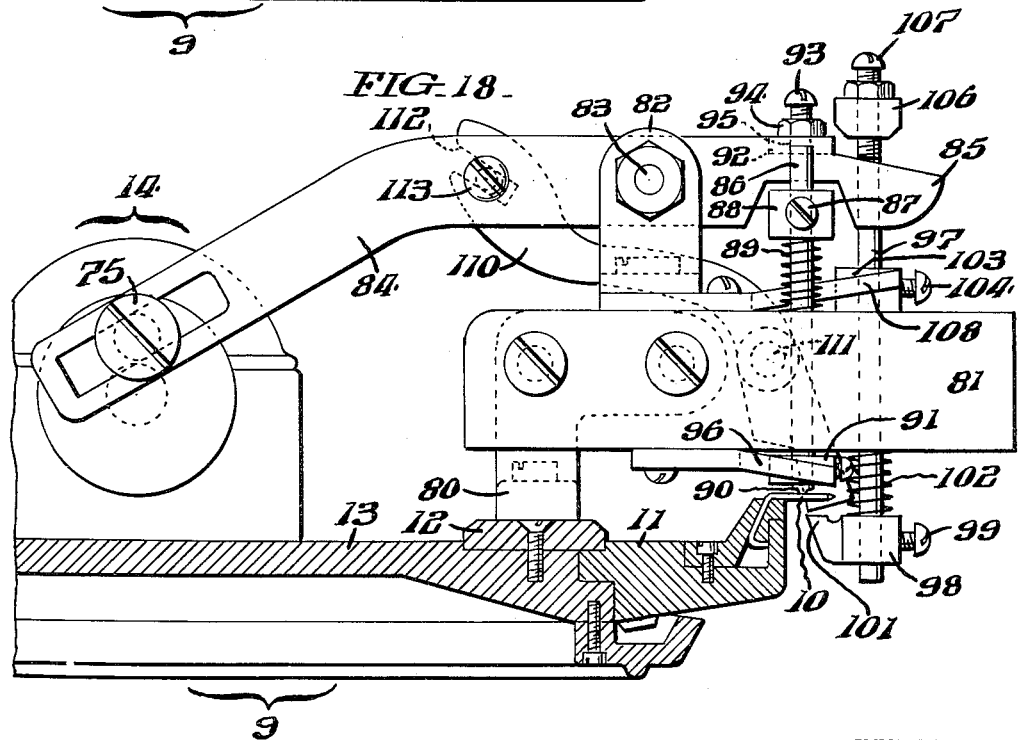

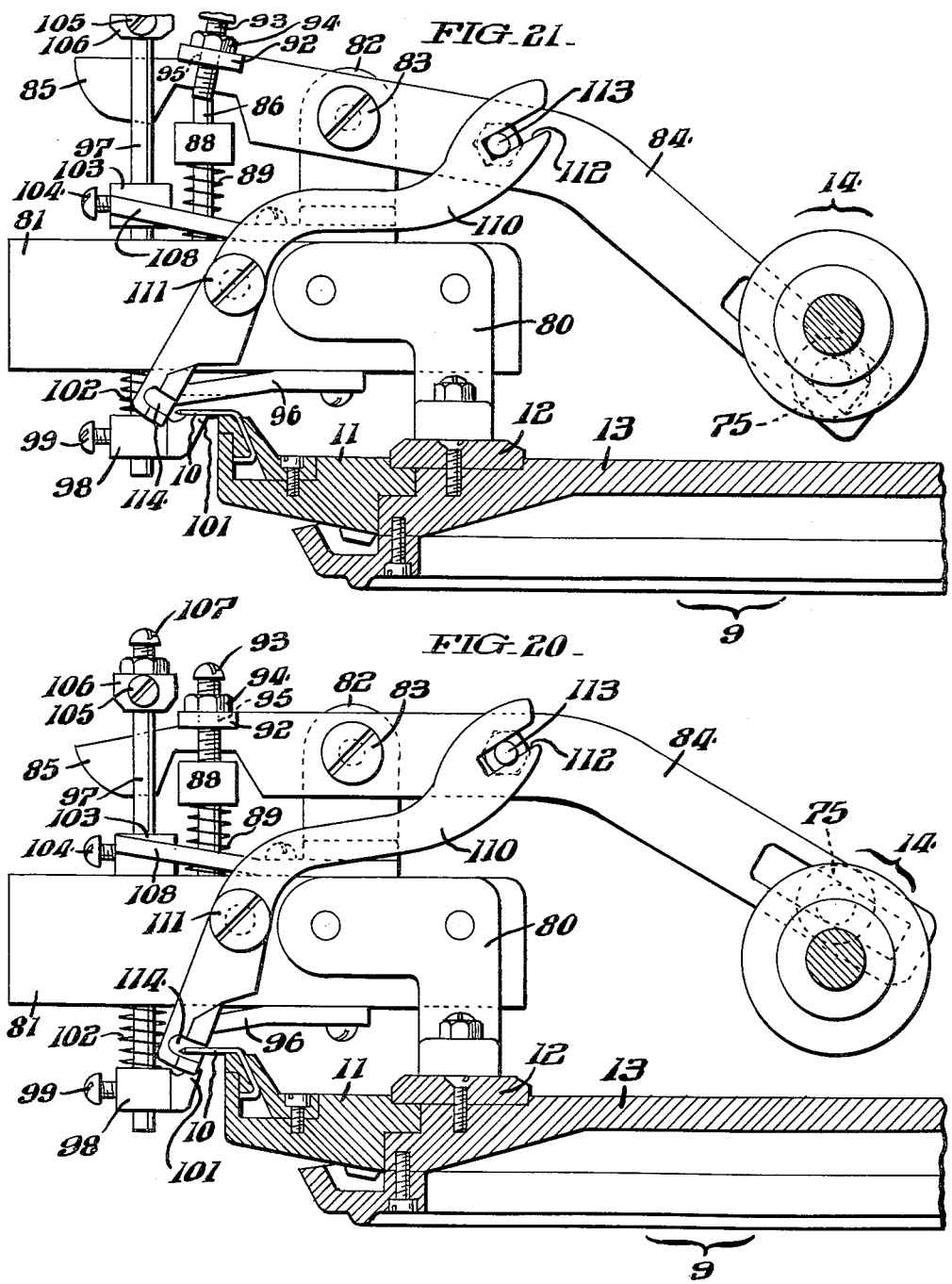

United States Patent Office 3,100,010
Patented Aug. 6, 1963

3,100,010
DEVICE FOR STRAIGHTENING AND ALIGN-
ING THE POINTS OF KNITWEAR LOOPING
MACHINES
Walter Ray Sizemore, Winston-Salem, N.C., assignor to
Hanes Hosiery Mills Company, Winston-Salem, N.C.,
a corporation of North Carolina
Filed Feb. 17, 1959, Ser. No. 793,722
1 Claim. (Cl. 153—39)

This invention relates to looping machines for knitted fabrics, such as hosiery and the like, and particularly relates to attachments for straightening and aligning the metal points of dial looping machines of the type shown in De Spain Patent No. 2,050,563.

The chief object of this invention is to provide an attachment for knitwear looping machines for automatically straightening and aligning the points thereof as such machine is operated to revolve the points in the normal manner.

A further object of this invention is to provide an attachment for straightening and aligning the points of knitwear looping machines comprising a stationary support adapted to be detachably secured to a looping machine adjacent to the points thereof, retractable point raising and point depressing elements mounted on the support so as to be normally disposed in spaced relation below and above the points, respectively, and means operative to advance the point raising and depressing elements, respectively, to strike and deflect at least one misaligned point of the looping machine to thereby straighten and align the same, such means being adapted to operate in timed relation with the movement of the looping machine points relative to the support.

A further object of this invention is to provide an oscillatable point spreading member supported on the looping machine and having a distal end adapted to penetrate between adjacent points of the machine to thereby straighten the same, and means adapted to oscillate such member in timed relation to the movement of the points whereby the distal end of the member penetrates between successive points.

Other objects and attendant advantages of this invention will be apparent from the annexed drawings, wherein:

FIG. 2 is a fragmentary view in section taken as indicated by the angled arrows II—II in FIG. 1.

FIG. 3 is a fragmentary view in section taken as indicated by the angled arrows III—III in FIG. 1.

FIGS. 4 and 5 are fragmentary views in section showing the manner in which a misaligned point is straightened by the point raising means.

FIG. 6 is a fragmentary view in section taken as indicated by the angled arrows VI—VI in FIG. 5.

FIGS. 7 and 8 are fragmentary views in section showing the manner in which a misaligned point is straightened by the point depressing means.

FIG. 9 is a fragmentary view in section taken as indicated by the angled arrows IX—IX in FIG. 8.

FIG. 11 is a fragmentary view in section taken as indicated by the angled arrows XI—XI in FIG. 1 showing point spreading means.

FIG. 12 is a fragmentary view in section taken as indicated by the angled arrows XII—XII in FIG. 11.

FIG. 13 is a view similar to FIG. 11 showing the manner in which bent points are straightened by the point spreading means.

FIG. 14 is a fragmentary view in section taken as indicated by the angled arrows XIV—XIV in FIG. 13.

FIG. 15 is a fragmentary view in plan showing a modified attachment embodying this invention.

FIG. 16 is a fragmentary view taken as indicated by the angled arrows XVI—XVI in FIG. 15.

FIG. 17 is a fragmentary view in section taken as indicated by the angled arrows XVII—XVII in FIG. 16.

FIG. 18 is a fragmentary view in section taken as indicated by the angled arrows XVIII—XVIII in FIG. 16 showing the manner in which a misaligned point is straightened by the point depressing means.

FIG. 19 is a view similar to FIG. 18 showing the manner in which a misaligned point is straightened by the point raising means.

FIG. 20 is a fragmentary view in section taken as indicated by the angled arrows XX—XX in FIG. 16 showing point spreading means engaging the points.

FIG. 21 is a view similar to FIG. 20 showing the point spreading means disengaged from the points.

Figure 1:
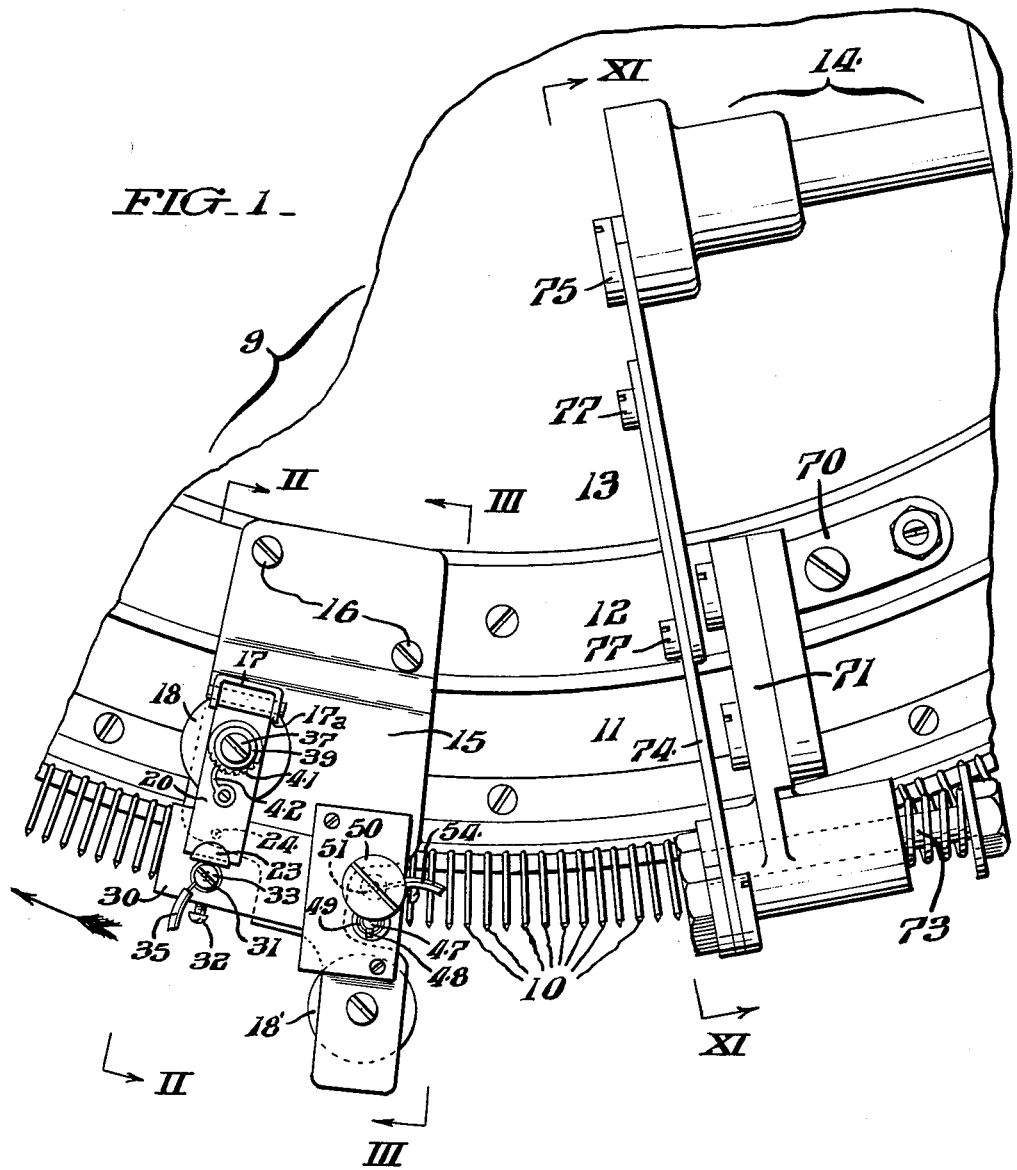
FIG. 1 is a fragmentary view in plan of a conventional knitwear looping machine having a preferred attachment embodying this invention.

The attachment of this invention illustrated in FIGS. 1–10 will be described first. In these figures there is partially shown a conventional knitwear looping machine 9 having the usual metal points 10 mounted horizontally on the normally clockwise revolvable dial ring 11. As shown, dial ring 11 is retained by the usual dial ring clamp 12 affixed to the stationary disc 13. The conventional drive shaft for the clipper mechanism is indicated at 14, but the clipper mechanism is detached therefrom and has been removed from the machine 9 for a purpose presently to be explained.

A support 15 is detachably secured to the ring clamp 12 by any suitable means, such as screws 16. While it is preferred that support 15 be detachably affixed to the ring clamp 12, it may be affixed to the stationary disc 13, if desired. Disposed upon the top of support 15 (see FIG. 2) is a U-shaped bracket 17 on which is mounted a solenoid 18 having a fixed core 19. The radially inward leg of the bracket 17 is formed with an extension 17a at the end of which is pivotally mounted an armature 20. A block 22 is mounted on the outward leg of the bracket 17, said block having affixed to its distal side a stop 23 for limiting the upward movement of the armature 20.

Disposed between the outward leg of bracket 17 and stop 23 is a retractable point depressing rod or element 24 which passes slidably through axially aligned apertures 25 and 26 in the block 22 and the support 15, respectively. As shown in FIG. 2, the upper end of rod 24 is contiguous with the distal end of armature 20, while the lower end of rod 24 normally is disposed in spaced relation to the proximal ends of the points 10. The lower end of rod 24 is maintained in spaced relation to the points 10 by means of a coil spring 27 disposed about rod 24 between support 15 and a collar 28. The compression of spring 27 may be varied by adjusting the position of collar 28 on rod 24. Collar 28 is retained in position on rod 24 by means of a conventional set screw.

Also suitably mounted upon the top of support 15, above the points 10, is an electrically insulated block 30 having an internally threaded metal insert 31 retained therein (see FIG. 7). Insert 31 and rod 24 are disposed in the same radial plane. Threadedly engaged internally of the metal insert 31 is a vertically adjustable sensing contact or element 33 which passes through an aperture 34 in support 15 so that its lower end is disposed adjacent to and is slightly spaced from the normal horizontal position of the distal ends of the points 10. More particularly, sensing contact 33 is mounted within block 30 so that its lower end clears the distal ends of the points 10 when such points are properly aligned, as shown in FIG. 2, but will contact the distal end of any point 10 which is misaligned above the horizontal to an extent greater than any predetermined degree, as shown in FIG. 7. By means of the threads thereof, sensing contact 33 is adjustable vertically with respect to the distal ends of the points 10, and may be held in any desired position with respect to the points by means of a conventional set screw 32. Thus, the tolerance of upward misalignment of the points 10 to the horizontal may be varied as desired. Since sensing contact 33 and rod 24 are disposed in the same radial plane, they are always disposed above the same point 10.

An electrical conductor 35 is soldered or otherwise suitably affixed to the metal insert 31. Through electric conductor 35 and the metal insert 31, sensing contact 33 is electrically connected, by a circuit presently to be explained, to solenoid 18 so that when the lower end of sensing contact 33 touches or strikes a misaligned point 10, solenoid 18 is energized. When solenoid 18 is energized, with consequent magnetization of its core 19, armature 20 is attracted downward about its pivot. The downward movement of armature 20 toward core 19 forces the point depressing rod 24 downward (see FIGS. 8 and 9), against its spring 27 to strike the proximal end of the point 10 which had been struck by the sensing contact 33, to thereby deflect and bend such point downward to properly align it in the horizontal plane of the points 10. As soon as contact between sensing element 33 and the misaligned point 10 is broken, the circuit to solenoid 18 is opened, with consequent demagnetization of the solenoid core 19. Upon the demagnetization of core 19, rod 24 and armature 20 are returned by the force of spring 27 to their normal positions shown in FIG. 2.

The extent to which rod 24 may be advanced (i.e. moved downward against the points 10) is controlled by means of an adjustment screw 37. Screw 37 extends through a threaded aperture in block 38 mounted on armature 20 and through an axially aligned aperture in armature 20 so as to be disposed substantially axially of the core 19 with its lower end spaced from the top of the core. Thus, when core 19 is magnetized to attract armature 20 downward, the extent of the movement of armature 20 downward is limited by the lower end of adjustment screw 37 striking the core 19 as a stop. Vertical adjustment of the screw 37 thus controls the extent of downward movement of the point depressing rod 24. To facilitate the setting of adjustment screw 37, an index wheel 39 may be circumferentially disposed about the shank of screw 37 and retained in position thereon by a set screw 40. Thus, index wheel 39 will be turned upon turning of the adjustment screw 37. A dial 41 integrally formed on index wheel 39 and a separate pointer 42 mounted upon the upper surface of armature 20 may be utilized to record the various positions of the adjustment screw 37 with respect to core 19. A set screw 43 is utilized to retain adjusting screw 37 in any predetermined position within block 38.

Affixed to the bottom surface of support 15 (see FIG. 3) is a U-shaped bracket 17' similar in construction to bracket 17 previously described. Bracket 17' supports a retractable point raising rod 24', and also supports means for actuating the rod 24' in a manner similar to that described with respect to bracket 17. More particularly, disposed internally of bracket 17' is a solenoid 18' having a fixed core 19'. The radially outward leg of bracket 17' is formed with an extension 17a' on which is pivotally mounted an armature 20'. A block 22' is mounted on the inward leg of bracket 17' and has affixed thereto a stop 23' for the armature 20'. Also affixed to the inward leg of bracket 17', intermediate of block 22' and support 15, is a second block 45.

The point raising rod 24' is disposed between the inward leg of bracket 17' and stop 23', and passes slidably through axially aligned apertures 25' and 46 in the blocks 22' and 45, respectively. The lower end of point raising rod 24' is contiguous with the distal end of armature 20', while the upper end of rod 24' normally is disposed adjacent and in spaced relation to the points 10, as shown in FIG. 3. The upper end of rod 24' is disposed intermediate of the distal and proximal ends of the points 10, but preferably is disposed closer to the latter. The upper end of rod 24' is maintained in spaced relation to the points 10 by means of a coil spring 27' disposed about rod 24' between block 45 and an adjustable collar 28'.

Slidably mounted within the insulating block 30, in the same radial plane as rod 24', is a second sensing contact or element 47. The lower end of sensing contact 47 is hook-shaped so as to clear the distal ends of the points 10 which are properly aligned. The end of the hook of sensing contact 47 normally is disposed adjacent to and spaced slightly below the normal horizontal position of the distal ends of the points 10. Thus, while the lower end of sensing contact 47 will clear the points 10 which are properly aligned, as shown in FIG. 3, it will contact the distal end of any point 10 which is misaligned below the horizontal to an extent greater than any predetermined degree, as shown in FIG. 4.

A tranverse pin 48 is passed through sensing contact 47 adjacent its upper end, and a coil spring 49 is disposed about sensing contact 47 between pin 48 and the upper surface of the insulating block 30. Vertical adjustment of sensing contact 47 is obtained by the downward pressure exerted thereon, against spring 49, by the underside of the head of an adjustment screw 50 threadedly engaged within a metal insert 51 within the insulating block 30. The vertical position of the adjustment screw 50 is maintained by a set screw 52. Thus, by means of adjustment screw 50, the lower end of sensing contact 47 is adjustable with respect to the distal ends of the points 10, thereby controlling the tolerance permitted of downward misalignment of the points 10 to the horizontal.

An electrical conductor 54 is soldered or otherwise suitably affixed to the metal insert 51. Through the electrical conductor 54, metal insert 51 and adjustment screw 50, sensing contact 47 is electrically connected, by a circuit presently to be explained, to solenoid 18' so that when the lower end of sensing contact 47 touches or strikes a misaligned point 10, solenoid 18' is energized. The energization of solenoid 18', and the consequent magnetization of its core 19', causes armature 20' to be deflected upwardly about its pivot, thereby advancing point raising rod 24', against the spring 27', to strike the misaligned point and deflect and bend it upward, in the manner shown in FIGS. 5 and 6, to thereby properly realign the point.

As soon as contact between sensing element 47 and the misaligned point 10 is broken, the circuit to solenoid 18' is opened, with conseqeunt demagnetization of the solenoid core 19'. Upon the demagnetization of core 19', rod 24' and armature 20' are returned by the force of spring 27' to their normal positions shown in FIG. 3.

The extent to which the point raising rod 24' is thus raised or advanced is controlled by means of an adjustment screw 37' threadedly mounted in block 38' and passing through an aperture in armature 20' so as to be positioned to strike core 19' when armature 20' is deflected upward. The setting of adjustment screw 37' may be controlled by a dial 41' on index wheel 39' and a separate pointer 42'. A set screw 43' is utilized to retain the setting of adjustment screw 37', and a set screw 40' retains index wheel 39' on the body screw 37'.

In the operation of the attachment, the dial ring 11 of the looping machine 9 is revolved at a relatively slow speed in the conventional manner. As the ring 11 revolves, the points 10 pass between the proximate ends of the sensing contacts 33 and 47. The points 10 which are properly aligned in the horizontal plane, or are within permissible degrees or tolerances of the horizontal, pass between the sensing contacts 33 and 47 without touching or striking them. If, however, one of the points 10 is bent upward to an extent exceeding the permissible tolerance, it will, as it moves about the stationary disc 13 of the machine 9, strike the lower end of sensing contact 33, thereby energizing solenoid 18 to advance the point depressing rod 24 to strike the misaligned point and deflect it and return it to proper alignment. Similarly, if one of the points 10 is bent downward to an extent exceeding the permissible tolerance, it will strike the lower end of sensing contact 47, thus energizing solenoid 18' to advance the point raising rod 24' to strike, deflect and return the misaligned point to proper alignment. The extent to which a point is deflected depends on the extent of advance of rods 24 and 24', which in turn is governed by screws 37 and 37'.

Preferably, the proximate ends of the rods 24 and 24' are tapered or of frusto-conical formation to facilitate their striking action against the points 10. As shown in FIG. 1, the brackets 17 and 17' preferably are spaced circumferentially with respect to each other. If desired, however, the brackets 17 and 17', and hence sensing contacts 33 and 47 and rods 24 and 24', may be radially aligned.

Figure 10:
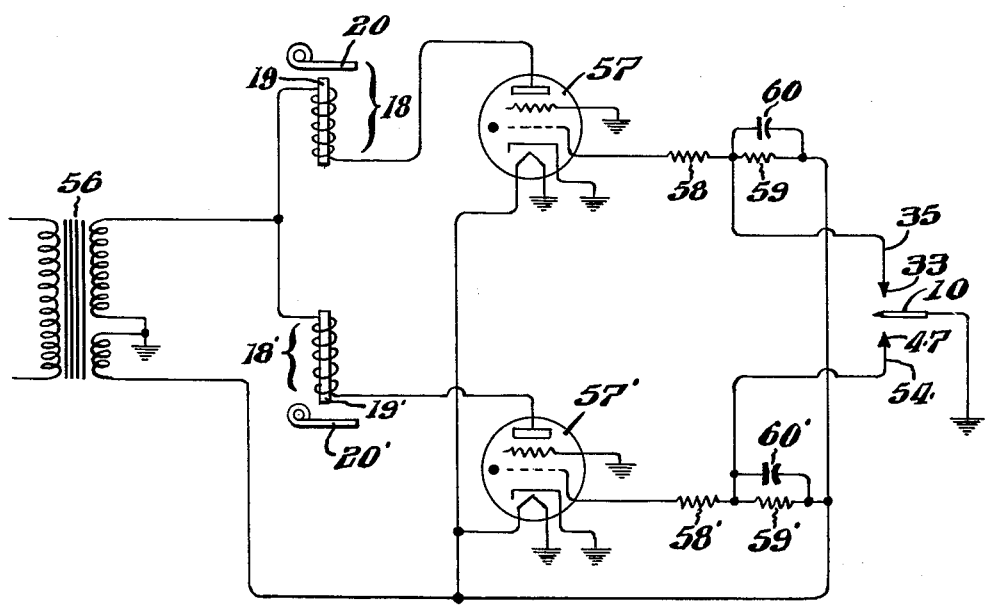
FIG. 10 is a schematic view of a preferred electrical system for the automatic operation of the apparatus shown in FIGS. 1–9.

An electric circuit for the automatic operation of the apparatus is shown in FIG. 10. The circuit includes a transformer 56, thyratron tubes 57 and 57', resistances 58, 58', 59 and 59' and capacitances 60 and 60'. As shown, the electrical conductors 35 and 54 are electrically connected to the transformer 56 and to the control grids of the thyratron tubes 57 and 57', respectively. When a misaligned point 10 strikes or comes into contact with the sensing element 33, a circuit is completed to the control grid of thyratron tube 57 and causes that tube to fire and pass an electric current through solenoid 18, thereby actuating the point depressing rod 24. Similarly, when a misaligned point 10 strikes or comes into contact with the sensing element 47, a circuit is completed to the control grid of thyratron tube 57' and causes that tube to fire and pass an electric current through solenoid 18', thereby actuating the point raising rod 24'.

In FIGS. 11–14, there is disclosed a point spreading attachment for straightening points 10 which have been bent or misaligned within the horizontal plane of the points. This attachment comprises a bracket 70 detachably secured to the ring clamp 12 of the machine 9 by any suitable means, such as screws. Sustained on bracket 70 is a radially disposed support 71 on the distal end of which is mounted an oscillatable point spreading lever or member 72. Lever 72 is adapted to oscillate on support 71 about a spring loaded pin 73 which passes through the lever. The upper end of lever 72 is connected to an adjustable pitman arm 74 which, in turn, is connected to the drive shaft 14 of the conventional clipper mechanism (not shown) by means of a crank 75. The lower or distal end 76 of lever 72, as shown in FIGS. 12 and 14, is wedge-shaped so as to permit the ready penetration of the distal end of the lever between successively adjacent points 10 of the looping machine.

The clipper mechanism shaft 14 conventionally is adapted to rotate in timed relation with the movement of the points 10 so that upon each advance of any point 10 to its next successive circumferential position, the shaft 14 will complete one revolution. Thus, shaft 14 causes lever 72 to oscillate in timed relation to the movement of the points 10 so that the wedge 76 penetrates successively between each pair of successive points 10 to thereby straighten the points in the manner shown in FIGS. 12, 13 and 14.

Control of the timing of the action of lever 72 may be effected by adjustment of the length of the pitman arm 74 through adjusting screws 77. In order to use the attachment shown in FIGS. 11–14, the conventional clipper mechanism, of course, must first be disconnected from its shaft 14 and removed from the machine 9.

In FIGS. 15–21, is shown a modified attachment embodying this invention. Like the attachment shown in FIGS. 11–14, the modified attachment is operated by means of the clipper mechanism drive shaft 14, with such mechanism removed from the looping machine 9. The modified attachment includes a bracket 80 detachably affixed to the ring clamp 12 by any suitable means, such as screws. If desired, bracket 80 may be affixed to the stationary disc 13. Sustained at the upper portion of bracket 80, by any suitable means, such as screws, is a radial support 81 having a bracket 82 affixed to the upper surface thereof. Mounted on the upper portion of bracket 82, by means of a pin 83, is an oscillatable rocker arm 84, one end of which is secured to the drive shaft 14 by the crank 75. The other or distal end 85 of the rocker arm 84 is free to oscillate about pin 83 upon rotation of shaft 14.

Slidably mounted in support 81 above the points 10 of the looping machine 9 is a retractable point depressing element or rod 86 having affixed to its upper end, by means of a set screw 87, an adjustable elongated collar 88. Disposed about rod 86 between support 81 and collar 88 is a coil spring 89. The compression of spring 89 may be varied by varying the setting of the adjustable collar 88 on rod 86.

The lower end of point depressing rod 86 is flattened to form a tongue 90 which, as shown in FIG. 16, spans and is adapted to strike two adjacent points 10. If desired, the lower end of rod 86 may be formed to strike only one point 10 or to span and strike any desired number thereof.

The spring 89, acting against collar 88, serves to urge point depressing rod upward away from the points 10. The action of spring 89 in this respect is governed by an adjustable stop 91 which is secured to the lower end of rod 86, below support 81, by a set screw. Thus, by means of proper adjustment of the stop 91, the lower end of tongue 90 of the point depressing rod 86 normally is maintained above points 10 in spaced relation thereto.

Affixed to rocker arm 84 adjacent the distal end 85 thereof is an offset 92 having an aperture 95 centrally disposed therein. Affixed to the top of offset 92, and axially aligned with the aperture thereof, is a threaded nut 94 in which is engaged a screw 93. The lower end of screw 93 is adapted to strike the upper surface of the collar 88 (see FIG. 20) upon the downward oscillatory motion of the distal end 85 of rocker arm 84, thereby forcing the point depressing rod 86 downward, against spring 89, to strike and depress two of the looping points 10. A guide 96 below support 81 is disposed in sliding engagement with stop 91, and serves to ensure the vertical alignment at all times of the point depressing rod 86.

Also slidably disposed in support 81 in a retractable point raising rod 97 having an adjustable point raising element or block 98 secured to its lower end, below support 81, by means of a set screw 99. The radially inward end of block 98 is formed with a point raising surface 101 which, preferably, is adapted to span and strike two successive points 10. As will be readily understood, the point raising surface 101 may be formed to strike merely one point 10 or to span and strike any desired number thereof.

A coil spring 102 is disposed about the lower end of point raising rod 97 between the lower surface of support 81 and the upper surface of block 98, and thus serves to urge the point raising surface 101 of block 98 to a position spaced below the points 10. An adjustable stop 103 disposed on rod 97 above the upper surface of support 81 controls the extent to which spring 102 spaces the point raising surface 101 below points 10. A set screw 104 maintains the adjustable stop 103 in position on point raising rod 97. A guide 108 on the upper surface of support 81 is disposed in sliding engagement with stop 103 to ensure the vertical alignment of rod 97 at all times.

Affixed to the upper end of point raising rod 97 by means of a set screw 105 is an adjustable elongated collar 106. Disposed in the collar is a screw 107 which is adapted to be struck by the distal end 85 of rocker arm 84 (see FIG. 19) upon its upward oscillatory movement. When the distal end 85 of the rocker arm 84 strikes screw 107, the point raising rod 97 and point raising block 98 are forced upward against spring 102 with the result that the point raising surface 101 strikes and bends upward two of the looping points 10.

With the attachment of FIGS. 15–21, all of the points 10 are acted upon successively. As shown in FIGS. 15 and 16, the point raising rod 97 circumferentially precedes the point depressing rod 86. Thus, the points first are struck and deflected upwardly by the point raising surface 101 and thereafter are struck and deflected downwardly by the tongue 90 of point depressing rod 86. The extent to which the rods 86 and 97 are advanced toward the points 10 is determined by adjustment of the screws 93 and 107.

Since the drive shaft 14 is adapted to rotate in timed relation to the movement of the points 10 about the stationary disc 13, the rods 86 and 97 will be actuated by rocker arm 84 in timed relation to the travel of the points. Thus, when the looper points 10 are caused to revolve at a relatively slow speed in the conventional manner, they successively are struck and raised by the point raising block 98 and then are struck and depressed by the point depressing tongue 90. Proper adjustment of the vertical movement of the rods 86 and 97 will ensure the proper realignment of all the points 10 as they move about the stationary disc 13.

As shown in FIGS. 20 and 21, a second rocker arm 110 is affixed to support 81 and adapted for oscillatable motion about pin 111. The upper end of rocker arm 110 is formed with a slot 112 adapted to receive a pin 113 affixed to rocker arm 84. The lower or distal end 114 of rocker arm 110 has a wedge-shaped formation adapted to penetrate between successively adjacent points 10, to thereby straighten the same, in the manner shown in FIGS. 17 and 20. Oscillatory motion in transmitted to rocker arm 110 from shaft 14 by means of crank 75, rocker arm 84 and pin 113. Thus, as the points 10 travel about the stationary disc 13 of the machine 9, the wedge 114 of rocker arm 110 will penetrate between successive points to thereby straighten any which have become misaligned in the horizontal plane.

In describing the preferred embodiments of this invention illustrated in the drawings, specific terminology has been utilized for the sake of clarity. It is not the intention to be limited to the specific terms selected herein, and it is to be understood that each specific term includes all technical equivalents which operate in a similar manner to accomplish a similar purpose. While certain preferred embodiments of this invention have been described in detail, it will be obvious to one skilled in the art that various modifications may be made therein without departing from the invention as hereinafter claimed.

Having thus described my invention, I claim:

On a dial looping machine having a fixed portion and an annular continuously rotatable dial having projecting normally radially from the periphery thereof a plurality of points which normally lie in the same horizontal plane, the rotation of said dial moving said points along an annular path in said horizontal plane; an attachment for straightening said points vertically and means for spreading said points laterally; said attachment comprising a support mounted on said fixed portion of said looping machine and projecting beyond said annular path, first and second point straightening elements mounted on said support for vertical movement in opposing directions in first and second vertical planes respectively, first and second electrical detecting means mounted on said support for detecting points which lie either above or below said normal horizontal plane of said points as said points move transversely through said first and second vertical planes respectively, and first and second actuator means mounted on said support actuable in response to a signal from the corresponding electrical detecting means for independently vertically moving the corresponding one of said point-straightening elements to contact and straighten a point detected as lying outside of said normal horizontal plane as said point moves transversely through the vertical plane of said point-straightening element, said first and second electrical detecting means including a first electrically conductive element mounted in said support and adjustably positioned in said first vertical plane just above said normal horizontal plane of said points and a second electrically conductive element mounted in said support and adjustably positioned in said second vertical plane just below said normal horizontal plane of said points, said first and second actuator means for independently vertically moving the corresponding one of said point-straightening elements comprising a first solenoid and a first electronic trigger device in circuit with said first electrically conductive element and a second solenoid and a second electronic trigger device in circuit with said second electrically conductive element, said first and second electronic circuit devices being adapted to be triggered by signals from said first and second electrically conductive elements respectively as a result of said elements making contact with points lying above or below respectively said normal horizontal plane, said first and second solenoids being adapted to be energized by said first and second trigger devices respectively to actuate said first and second point-straightening elements, respectively; said means for spreading said points laterally comprising an oscillatable lever supported in fixed non-rotatable position adjacent the points ahead of both of the vertical point-straightening elements, said lever being wedge shaped and adapted to penetrate between adjacent points to straighten points which have been bent toward each other out of their respective radial planes, thereby to straighten the points laterally to assure that as the points move transversely through the vertical planes of the said first and second vertical point-straightening elements each point lies successively entirely within the respective vertical plane.

References Cited in the file of this patent

UNITED STATES PATENTS

| | | |
|---|---|---|
| 1,361,513 | Altman | Dec. 7, 1920 |
| 1,361,528 | Maine | Dec. 7, 1920 |
| 2,498,496 | Jullie | Feb. 21, 1950 |
| 2,585,607 | Whitmore et al. | Feb. 12, 1952 |
| 2,848,659 | Cutler | Aug. 19, 1958 |
| 2,861,620 | Paulson | Nov. 25, 1958 |

FOREIGN PATENTS

| | | |
|---|---|---|
| 406,733 | Germany | Nov. 29, 1924 |
| 644,903 | Germany | May 15, 1937 |